United States Patent [19]

Fukuda et al.

[11] Patent Number: 5,333,126
[45] Date of Patent: Jul. 26, 1994

[54] INFORMATION RECORDING METHOD AND OPTICAL DISK APPARATUS USING SAME

[75] Inventors: Yasushi Fukuda, Odawara; Hiroshi Ide, Kodaira; Atsushi Saito, Ichikawa; Takeshi Maeda, Kokubunji; Fumiyoshi Kirino, Tokyo; Tsuyoshi Toda, Kodaira, all of Japan

[73] Assignee: Hitachi, Ltd., Tokyo, Japan

[21] Appl. No.: 16,897

[22] Filed: Feb. 12, 1993

Related U.S. Application Data

[63] Continuation-in-part of Ser. No. 460,370, Jan. 3, 1990, Pat. No. 5,233,589, and Ser. No. 588,361, Sep. 26, 1990, Pat. No. 5,229,986.

[30] Foreign Application Priority Data

Feb. 13, 1992 [JP] Japan .................................. 4-026510
Feb. 13, 1992 [JP] Japan .................................. 4-026519

[51] Int. Cl.$^5$ ............................ G11B 5/76; G11B 5/09
[52] U.S. Cl. ........................................ 369/59; 360/48; 360/51
[58] Field of Search ............... 360/40, 51, 53, 48; 369/59, 48; 371/42, 6

[56] References Cited

U.S. PATENT DOCUMENTS

| | | | |
|---|---|---|---|
| 4,484,176 | 11/1984 | Fitzpatrick | 369/59 X |
| 4,713,802 | 12/1987 | Kobata et al. | 360/51 X |
| 4,774,701 | 9/1988 | Okazi et al. | 369/59 |
| 4,777,542 | 10/1988 | Okazi | 360/48 |
| 4,819,103 | 4/1989 | Okamura | 360/66 X |
| 4,835,759 | 5/1989 | Saito et al. | 369/59 |
| 5,109,385 | 4/1992 | Karp et al. | 371/42 |
| 5,172,381 | 12/1992 | Karp et al. | 371/42 |
| 5,233,589 | 8/1993 | Saito et al. | 369/48 |

Primary Examiner—Donald Hajec
Assistant Examiner—Thien Minh Le
Attorney, Agent, or Firm—Fay, Sharpe, Beall, Fagan, Minnich & McKee

[57] ABSTRACT

When record marks are recorded on a recording medium while making a code symbol "1" of data by obtained coding write information according to a coding system having no DC free property correspond to every edge of the record marks, the recording is effected while inserting resynchronizing signals into the write information with a constant interval. For the resynchronizing signal either one selected between a first resynchronizing code pattern, in which the number of symbols "1" contained therein is even, and a second resynchronizing code pattern, in which the number of symbols "1" is odd, so that an accumulated charge obtained from the run length of the coded data approaches zero is used. Each of the first and the second resynchronizing code pattern contains at least a specified pattern, which doesn't meet the coding rule. The selection is effected by adding a run length switching code to the resynchronizing signal and by switching it to "0" or "1" depending on an output of a run length measuring circuit and a run length judging circuit. In this way it is possible to suppress fluctuations in the level of a reproduced signal obtained from the record marks recorded on the recording medium and to realize a stable data detection by using the original waveform detection method, by which the reproduced signal is converted into a binary signal by using a suitable slice level.

20 Claims, 6 Drawing Sheets

PATTERNS NOT APPEARING IN CODE WORDS (1) ······ 1 1 ······

INFORMATION RECORDING METHOD AND OPTICAL DISK APPARATUS USING SAME

CROSS-REFERENCE TO RELATED APPLICATIONS

This is a Continuation-In-Part application of Ser. No. 07/460,370 filed on Jan. 3, 1990 now U.S. Pat. No. 5,233,589 and Ser. No. 07/588,361 filed Sep. 26, 1990, now U.S. Pat. No. 5,229,986 the disclosures of which are hereby incorporated by reference.

BACKGROUND OF THE INVENTION

The present invention relates to an information recording method, by which write information is converted into a series of codes according to the run length limited coding rule and the series of codes is recorded while making it correspond to the positions of the lead edge and the tail edge of record marks formed in a data area on a recording medium and to an information storing apparatus using same. In particular, the present invention relates to an information recording method efficient for reducing level fluctuations of a signal reproduced in the case where data coded by using a coding rule having no DC free property are recorded on an optical disk medium and to an optical disk apparatus using same.

In an optical disk memory device, improvement in the signal-to-noise ratio of a reproduced signal and increase in the data detection window margin are effective for improving the reliability of data, i.e. reducing the error ratio. Two methods are known for converting a reproduced signal into a binary signal. By a first method a detection signal obtained from a record mark recorded on an optical disk is converted into a binary signal by using a certain slice level (hereinbelow denoted by original waveform detection method, but called also amplitude detection method), while by a second method a position corresponding to a code is detected by differentiating the detection signal (hereinbelow denoted by differentiation detection method, but called also peak detection method).

By a method, by which a code is made correspond to the center of the record mark, generally the detection signal from an optical head is first-order-differentiated and a zero cross point of a first-order-differentiation signal thus obtained is detected (hereinbelow denoted by mark position recording method). Further by a method, by which the code is made correspond to the two edges of the record mark (hereinbelow denoted by mark length recording method), generally the detection signal from an optical head is second-order-differentiated and a zero cross point of a second-order-differentiation signal thus obtained is detected.

The decrease in the signal-to-noise ratio produced when the reproduced signal is converted into the binary signal is smaller by the original waveform detection method. In the case of the differentiation detection method, since a frequency band is increased in the neighborhood of a differentiation constant (cut-off frequency), it is necessary to secure an originally satisfactorily good signal-to-noise ratio.

On an optical disk, apart from user data, specified data such as address data indicating the position on the disk, a pattern for pulling-in a PLL (Phase Locked Loop) for generating a reproduction clock, resynchronizing patterns inserted with a certain interval according to a predetermined format, etc. are recorded. Generally the address information is previously built-in in the form of pits at the fabrication of the disk. An example of such a format is determined by an ISO norm for a disk of continuous servo system having a diameter of 130 mm.

Here explanation will be made, taking this ISO norm as an example. For the coding system the mark position recording system using 2-7 RLL (Run Length Limited) coding is adopted and a one-byte resynchronizing mark is inserted for every 20 bytes of data. The resynchronizing mark (RESYNC) has a function of correcting the synchronization, in the case where the phase relation between the reproduction clock generated by the PLL and reproduced data is deviated by 1 bit or more because of defects, etc. on the disk. The number of data bytes between two adjacent resynchronizing marks is set within an extent, where errors can be corrected by the ECC (Error Correction Code). For this ISO format, since the mark position recording system is used and the position of the mark is detected by the differentiation detection method, no DC free property is required. Further only one sort of resynchronizing marks is used and no change thereof depending on the data pattern is effected.

SUMMARY OF THE INVENTION

An object of the present invention is to reduce level fluctuations of a reproduced signal produced in the case where code data coded by using a coding rule having no DC free property are recorded. By reducing level fluctuations of a reproduced signal it is made possible to adopt the original waveform detection method, which is advantageous with respect to the signal-to-noise ratio of the reproduced signal and in this way to realize stable data detection.

The DC free property, the self clocking and the detection window margin are cited as items characterizing the coding system (coding rule) for data.

The DC free property is a property that the recorded pattern on the medium after coding and an average level of the reproduced signal obtained from that recorded pattern don't depend on the data pattern before coding, but it is constant within a certain extent of the data length (e.g. 1 byte period). Accumulated charge is used by a method for evaluating the degree of the DC free property. When the polarity corresponding to the record mark or the mark side of the reproduced waveform obtained from that record mark is denoted by + (plus) and the polarity corresponding to the not recorded portion between marks, i.e. gap side, by − (minus), the accumulated charge means an accumulated value of the signs described above in a certain data period. In the case where the DC free property is completely met, this accumulated charge is always 0. In general, if the accumulated charge is 0 within a suitable section of the data length, e.g. 1 byte, it is judged that the data have the DC free property. The accumulated charge is called also DSV (Digital Sum Value).

When such a coding rule having the DC free property is used, no level fluctuations of the reproduced signal are produced, even in the case where the reproduced signal output is AC-coupled through a coupling capacitance. However, if a coding rule having no DC free property is used, level fluctuations of the reproduced signal are produced, depending on the data pattern to be recorded and it is difficult to detect the position of the edges with a high precision by the original waveform detection method. On the other hand, by the differentiation detection method, since a same number of amplitude signals are produced necessarily on the upper side and on the lower side owing to characteristics of differentiated waveforms and thus the average level of the differentiated signal is kept almost constant, even if the coding system (coding rule) itself has no DC free property, it is not necessary to take the DC free property into account.

Concerning the data detection window margin, the error production rate when fluctuations in the data detection position are produced decreases with increasing margin. The NRZ (Non Return to Zero) coding has a detection window margin identical to 1 bit of data before coding, which is the greatest detection window margin. However it has no self clocking property, which is one of the characteristics of the coding system. The self clocking property is a property that the clock for the reproduction can be generated from data themselves recorded on a medium. By th NRZ coding, since there are no change points of "1" and "0" when "1" or "0" appears successively in the data, no reproduction clock can be generated.

As a variation of the NRZ coding there is known the NRZI (Non Return to Zero Inverted), by which change points are inserted forcedly, but the problem on the DC free property remains.

In the case of the original waveform detection method, when a coding system having no DC free property is used, the level of the reproduced signal varies, depending on the pattern of the record data and thus it is difficult to detect the position of the edges with a high precision. Further it is necessary to use a DC amplifier, through which current of any frequency up to DC can pass. A DC amplifier is more difficult to manipulate than an AC amplifier in that it should have a great dynamic range and that it has remarkable offset or drift due to temperature variations or fluctuations in a power supply.

In order to use a system having no DC free property for the coding method and to use the original waveform detection method, which is advantageous with respect to the signal-to-noise ratio, it is an important problem to reduce fluctuations in the level of the reproduced signal. According to the present invention, even if a coding rule having no DC free property is used for the coding method, it is possible to AC-couple the reproduced signal, to convert it into a binary signal by the original waveform detection method and to realize a stable data detection by making the coding rule substantially DC free so that the level of the reproduced signal is not varied by the pattern of data coded by the coding rule, i.e. the accumulated charge approaches zero.

According to one of the features of the present invention, write information is converted into coded data according to a predetermined format for every recording unit (e.g. sector unit) determined depending on the recording medium to obtain record waveform data, in which the level is inverted at a symbol "1" in that coded data and recording is effected for every recording unit stated above by forming record marks corresponding to the record waveform data described above on a recording medium.

The coded data consist of a series of run length limited codes, into which the write information is converted for every recording unit by a predetermined coding rule, a first synchronizing signal (SYNC) for reproduction clock synchronization added at the beginning of the write information and a second synchronizing signal for resynchronization inserted for every a predetermined data length of the write information (hereinbelow denoted by resynchronizing signal RESYNC).

The resynchronizing signal (RESYNC) is selected among at least one sort of first resynchronizing code patterns, in which the number of symbols "1" contained therein is even, and at least one sort of second resynchronizing code patterns, in which the number of symbols "1" contained therein is odd. That is, either one selected among the first resynchronizing code patterns and the second resynchronizing code patterns is used so that the accumulated charge obtained from the run length (length between two adjacent symbols "1" in the coded data) approaches zero. Each of the first and the second resynchronizing code patterns contains at least a specified code pattern, which doesn't meet the coding rule described above. Such a specified code pattern is, e.g. in the case of the 1-7 coding system, a pattern of "1000000010000001".

According to one of the features of the present invention, the sum of lengths of record marks and the sum of lengths of parts, which are not the record marks, are approximately equal to each other within a recording unit, regardless of the write information. Consequently it is possible to keep the average level of the reproduced signal obtained when a signal is read out from the recording medium almost constant, independently of the write information.

The resynchronizing signal (RESYNC) can be obtained by preparing previously at least the specified code pattern and by generating either one of the first resynchronizing code patterns and the second resynchronizing code patterns, depending on the value of the accumulated charge.

According to one of the features of the present invention, the resynchronizing signal (RESYNC) contains predetermined bits of run length limited codes directly before the resynchronizing signal (RESYNC) is inserted, after the specified code pattern, in addition to the specified code pattern, which doesn't meet the coding rule described above.

According to one of the features of the present invention, the resynchronizing signal (RESYNC) contains a run length switching code consisting of either one of "1" or "0" corresponding to the value of the accumulated charge, in addition to the specified code pattern, which doesn't meet the coding rule described above.

Further, the resynchronizing signal (RESYNC) contains a first decoding code pattern for decoding the run length limited code directly before the resynchronizing signal (RESYNC) is inserted therein and a second decoding code pattern for decoding the run length limited code directly after the resynchronizing signal (RESYNC) has been inserted therein before and after the specified code pattern, respectively. As a result, it is possible to decode the coded data without being conscious of the resynchronizing signal.

In the case where the 1-7 coding system is used for the coding rule, the resynchronizing signal (RESYNC) contains a first decoding code pattern consisting of either one of "010" or "000" for decoding the run length limited code directly before the resynchronizing signal (RESYNC) is inserted therein before the specified code pattern and a second decoding code pattern consisting of either one of "001" or "000" for decoding the run length limited code directly after the resynchronizing signal (RESYNC) has been inserted therein after the specified code pattern.

Generated by changing the symbol representing a predetermined position "1" contained in the series of run length limited codes, into which a previously determined resynchronizing information is converted according to the coding rule, into "0" the specified code pattern can be contained in the resynchronizing signal (RESYNC).

For the recording medium it is suitable to use a disk recording medium having a track formed by connecting numerous sectors, each of which consists of a preformatted area, in which at least addresses are previously recorded, and a data area. In the case where an optical disk recording medium is used, the disk recording medium is irradiated with a light beam intensity-modulated according to record waveform data so that record marks corresponding to the record waveform data are formed by local temperature rise on the optical disk recording medium by the light beam.

According to one of the features of the present invention, even if an AC amplifier is used at the data reproduction, level shift of the reproduced signal can be decreased so that it can be neglected by setting a frequency determined from an interval more than twice as great as the insertion interval of the resynchronizing signal patterns sufficiently higher than the cut-off frequency of the AC coupling and thus a stable conversion into binary data can be realized. In this way, correction of the accumulated charge by the selection of the resynchronizing signal patterns acts with a high efficiency by setting the cut-off frequency in the low frequency band of the AC coupling amplifier sufficiently low with respect to the frequency corresponding to the insertion interval of the resynchronizing signal patterns. When the cut-off frequency in the low frequency band of the reproducing system is increased, taking fluctuations in the average level of the reproduced signal into account, it is necessary to shorten the insertion interval of the resynchronizing signal so that deviations of the edge detection position due to the fluctuations in the level remain always within the detection window margin. However, when the insertion interval of the resynchronizing signal is excessively shortened, overhead increases.

On the other hand, from the point of view of the function of correcting bit deviations between the reproduction clock and the reproduced data, which is the original object of the resynchronizing signal, it is more efficient with the decreasing insertion interval of the resynchronizing signal. However, from the point of view of increase in the overhead, it is necessary to select a suitable interval. By the mark length recording system and in order that the resynchronizing signal can be detected only from one side edge, some increase takes place in the pattern length of the resynchronizing signal. As an example, in the case where the mark length recording system is used in the 1-7 RLL coding system, it is possible to reduce level fluctuations (deviations of the accumulated charge from 0) of the reproduced signal and to realize stable recording/reproduction in a state where the self clocking property is maintained, even for a coding system having no DC free property by inserting a resynchronizing signal pattern of 2 bytes for every 30 bytes of the data.

Still further advantages of the present invention will become apparent to those of ordinary skill in the art upon reading and understanding the following detailed description of the preferred embodiments.

BRIEF DESCRIPTION OF THE DRAWINGS

The invention will be described in conjunction with certain drawings which are for the purpose of illustrating the preferred and alternate embodiments of the invention only, and not for the purposes of limiting the same, and wherein.

DESCRIPTION OF THE PREFERRED EMBODIMENTS

The following embodiments show examples, which can be applied to information recording/reproduction using an optical recording medium of pit type, magneto-optic type and phase change type and in particular an optical disk recording medium. However the present invention is not restricted thereto, but it can be applied also to information recording/reproduction using other recording medium such as a magnetic recording medium, etc.

Further, although the following embodiments show examples of the recording/reproduction system capable of effecting both recording and reproduction of information, it may be a system, in which a recording device and a reproducing device are separated.

Figure 1:
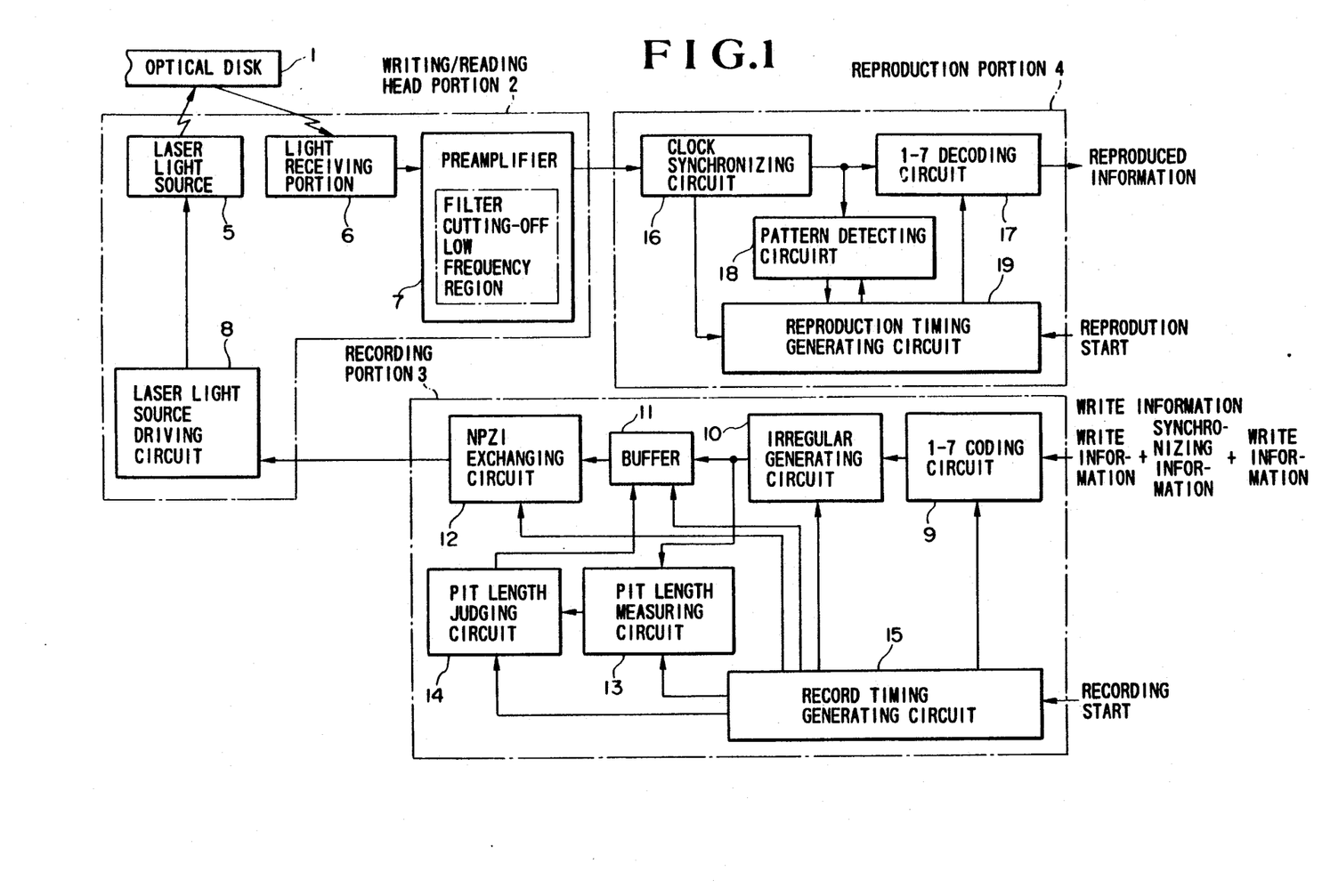
FIG. 1 is a block diagram showing an embodiment of the optical disk apparatus for realizing the recording method according to the present invention.

FIG. 1 is a block diagram showing an embodiment of the optical disk apparatus for realizing the recording method according to the present invention. Detailed construction of the optical disk apparatus is disclosed in U.S. applications Ser. No. 07/460,370 and Ser. No. 07/588,361. They are referred to and here only the part relating to the recording method according to the present invention will be explained.

The information recording/reproduction system using the optical disk apparatus according to the present invention effects information recording/reproduction by using an optical disk 1 rotated with a constant angular velocity by means of a spindle motor (not indicated in the figure). This system comprises a head portion 2 effecting writing/reading of data to/from the optical disk 1, a control device (not indicated in the figure) controlling the whole system including control of the writing/reading head portion 2 and control of the rotation of the optical disk 1, a recording portion 3 for converting information to be recorded into record waveform data, which should be written in the optical disk 1 by means of the writing/reading head portion 2, and a reproducing portion 4 for reproducing and decoding information from a signal read out from the optical disk 1 by means of the writing/reading head portion 2.

Further it is valid also for the following embodiments that the construction of the present embodiment is sectioned in this way for convenience' sake for the explanation and that the present invention is not restricted necessarily to such a sectioning method. Similarly various denominations such as writing/reading head portion, etc. are given only for convenience' sake and the construction of the information recording/reproducing system according to the present invention is not restricted thereby.

On the optical disk 1 there are disposed numerous tracks in a spiral shape or in a shape of coaxial circles along the rotational direction. This optical disk 1 is rotated with a constant angular velocity by a spindle motor (not indicated in the figure) controlled in the rotation. The tracks consist of e.g. grooves previously formed in a spiral shape or in a shape of coaxial circles along the rotational direction and lands formed between two adjacent grooves. Information is recorded/reproduced on/from the lands between the grooves, while using the grooves as a guide for tracking. Each of the tracks is divided into a plurality of sectors and the information recording/reproduction is effected in unit of this sector.

Figure 2:
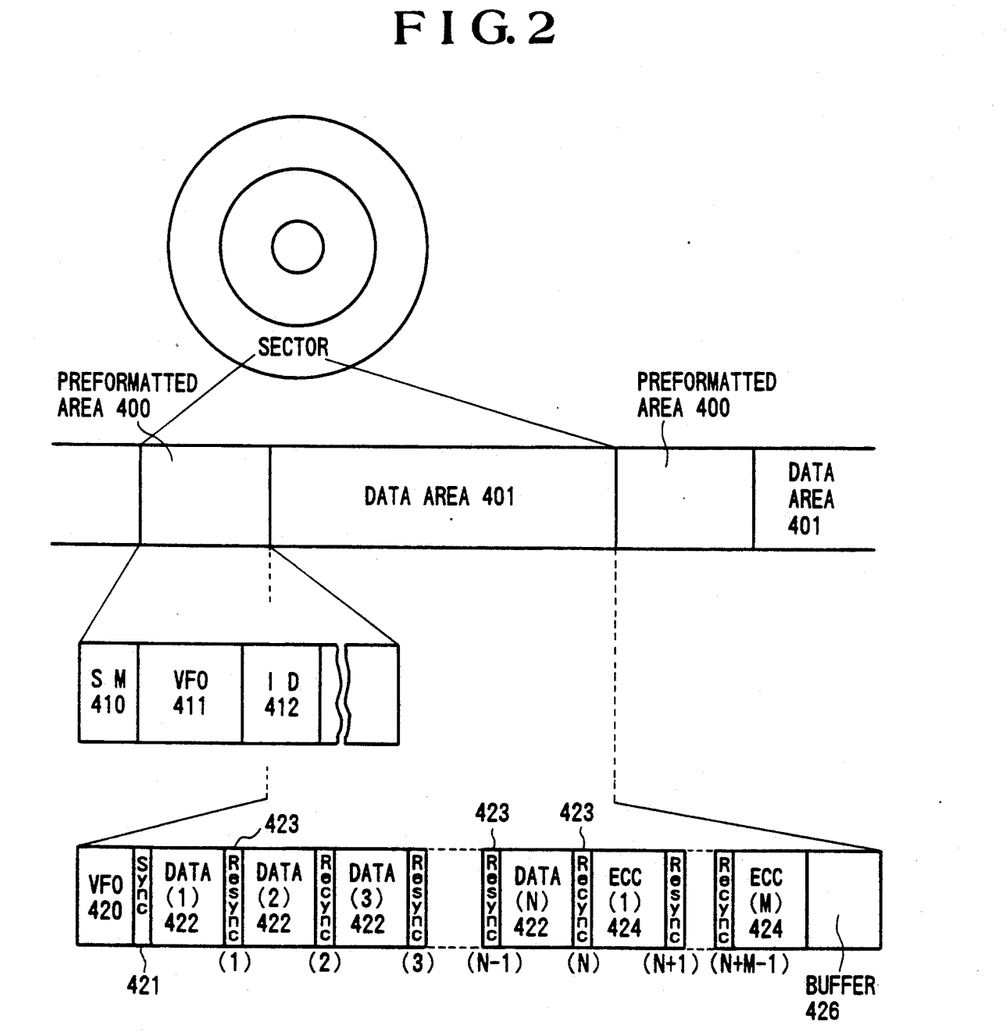
FIG. 2 is a conceptual diagram indicating a recording format on an optical disk recording medium used for realizing the present invention.

FIG. 2 shows an example of the recording format for each of the sectors on the optical disk 1. Each of the sectors is identified physically by an identification number called sector address. At the head of each of the sectors there is disposed a preformatted area 400 constituting a sector head portion. In this sector head portion, a sector mark (SM) 410 for making the system recognize that it is the head of the sector, a VFO synchronizing pattern (VFO) 411 for starting the generation of the clock signal by means of a PLL circuit, an ID area (ID) 412, in which address information such as the sector address, etc., and so forth are preformatted at need at the fabrication of the optical disk. A data area 401 succeeding this preformatted area (sector head portion) 400 is the region, where record marks (pits or state changing portions such as magnetization domains, etc.) are recorded really at the recording by the recording/reproducing system indicated in FIG. 1. Recording information in the data area within each of the sectors is effected e.g. by irradiating lands (not yet recorded region) with a light beam intensity-modulated according to the record waveform data to melt a recording film by utilizing local temperature rise by the light beam to form state changing portions (record marks) called pits. Also in the case of a magneto-optical disk, information recording is effected similarly by forming state changing portions (record marks) called magnetization domains having different magnetization direction in the land area. In the present embodiment, the lead edge and the tail edge of the state changing portions (record marks such as pits, magnetization domains, etc.) are made correspond to the position of the code symbol "1". That is, information is recorded on the recording medium by making a code symbol "1" in the pattern coded by using the run length limited coding correspond to an inversion portion of a state change formed on the medium.

In the data area 401 in a sector, there are recorded at first a VFO synchronizing pattern (VFO) 420 for generating the clock signal by means of a PLL circuit and a synchronizing signal (SYNC) 421 for locking the frequency of the clock signal stated above. Although a signal having a function similar to that of this synchronizing signal (SYNC) exists also in the sector head, the synchronizing signal in the sector head is preformatted and not recorded really at the recording by the recording/reproducing system indicated in FIG. 1. For the case where there is a deviation between the clock signal generated from the synchronizing signal in the sector head portion and the clock signal formed in the data area at the recording, clock information in the data area used at the recording is recorded at the beginning of the data area as a synchronization signal (SYNC) and the synchronization with the write information recorded in the data area is secured by finely regulating the clock signal generated by the PLL circuit by using this synchronizing signal (SYNC).

In the data area 401 a signal obtained by code-converting user information (record waveform data) 422 is recorded, succeeding this synchronizing signal (SYNC). The amount of information recorded in one sector is previously determined for every optical disk and it is usually 1K bytes or 512 bytes. An error correcting code (ECC) 424 for detecting and correcting errors, in the case where the user information is erroneously detected by noise at the reproduction, is recorded after this predetermined amount of user information. A resynchronizing signal (RESCYNC) 423 of predetermined amount (e.g. 2 bytes) is inserted in the write information consisting of these user information (DATA) 422 and error correcting code (ECC) 424 for every predetermined amount (e.g. 20 bytes or 30 bytes) and recorded together with the resynchronizing signal stated above.

The resynchronizing signal (RESCYNC) 423 is disposed for dealing with phenomena that a deviation of an integer of periods is produced in the clock signal generated by the PLL circuit, while no clock information can be detected from the reproduced signal at the reproduction in a part (defective part), where record marks cannot be recorded successively because of defects on the recording medium, and following signals are erroneously detected. That is, resynchronizing signals, owing to which signals can be identified, even if the clock is deviated, are recorded in the write information (user information and error correcting codes) with a predetermined interval so that following information detection is returned to a normal state by effecting resynchronization while detecting deviations in the clock signal at the reproduction, based on these resynchronizing signals. The present invention relates to an improvement of this resynchronizing signal (RESCYNC).

Further a buffer 426 for adjusting fluctuations in one sector time produced by rotation jitters, etc. follows the user information and the error correcting codes recorded together with the resynchronizing signal and further the head of the succeeding sector follows it.

The writing/reading head portion 2 is composed of a laser light source 5 irradiating the optical disk 1 with a light beam; a light receiving portion 6 detecting reflected light of the light beam from the optical disk 1; a preamplifier 7 amplifying a detection signal detected by the light receiving portion 6 to a desired signal level by AC-coupling; and a laser light source driving circuit 8 driving the laser light source 5 so that the optical disk 1 is irradiated with a pulsed light beam, responding to the write information, at the recording mode and with a light beam having a constant light intensity at the reproduction. In order that the irradiation position with the light beam emitted by the writing/reading head portion 2 can be moved in a radial direction on the optical disk 1, corresponding to the information recording/reproduction position, at least a part of the optical system, which leads the light beam from the laser light source 5 to the optical disk 1 and focuses it thereon, e.g. an objective lens, is mounted on a moving mechanism such as a linear actuator, etc. Since the construction of the optical system and the moving mechanism is disclosed e.g. in U.S. Pat. No. 4,866,692 and doesn't relate directly to the present invention, it is not indicated in the figure. Although the preamplifier 7 outputs also control signals for controlling the irradiation position with the light beam such as the focusing control, the tracking control, etc., since this doesn't relate directly to the present invention, explanation thereof will be omitted here.

It is preferable to remove the DC component from the detection signal detected by the receiving portion 6 by means of a filter 70 cutting-off the low frequency component. This is because noise generated by a mechanism for tracing the focal point of the light spot (AF mechanism) is superposed abundantly on the detection signal in the low frequency region so that it is necessary to remove this noise component in order to reproduce surely the information.

Further necessary means and functions are added to the writing/reading head portion 2 in accordance with the mode for recording information in the optical disk I (pit, magnetization domain or phase change). For example, in the case where a magneto-optical disk medium is used and information is recorded by forming magnetization domains, there are disposed magnetism applying means such as a writing magnetic head, etc. and a driving circuit for driving it (none of them being indicated in the figure) in addition to the writing/reading head portion 2.

The recording portion 3 is disposed for converting the write information into coded data according to the sector format indicated in FIG. 2 and composed of a 1-7 converting circuit 9 for converting recording blocks in unit of the sector, in which synchronizing information (consisting of synchronizing signals 421 and resynchronizing signals 423) is inserted into the write information (consisting of USER DATA 422 and ECC 424 added at need) for every predetermined amount into coded data (code patterns) consisting of run length limited codes according to a predetermined coding rule (1-7 coding system in the present embodiment); an irregular generating circuit 10 for converting the synchronizing information (particularly resynchronizing signals 423) contained in the output of the 1-7 converting circuit 9 into code patterns, which don't meet the 1-7 run length code converting rule; a buffer (BUFF) 11 for storing the output of the irregular generating circuit 10; a pit (run length) measuring circuit 13 for measuring the run length of state changing portions (record marks such as pits, magnetization domains, etc.) and the run length of portions, which are not state changing portions (neither pits nor magnetization domains) from the output of the irregular generating circuit 10; and a pit length (run length) judging circuit 14 for selecting either one of a first resynchronizing code pattern, for which the number of symbols "1" contained therein as resynchronizing signal patterns is even, and a second resynchronizing code pattern, for which the number of the symbols "1" is odd, so that the accumulated charge obtained from the run length (length between adjacent two symbols "1") in the coded data on the basis of the result of the pit (run length) measuring circuit 13 approaches zero. In the present embodiment, the length of the state changing portions (record marks) and the length of the portions, which are not pits (record marks), are made equal to each other in the whole recording block, by selecting either one of the first resynchronizing code pattern and the second resynchronizing code pattern by adopting either "1" or "0" for the pit length (run length) switching code contained in the resynchronizing code pattern. The buffer 11 has a function of adopting either "1" or "0" for the pit length (run length) switching code contained in the resynchronizing code pattern in order to make the length of the pits (record marks) and the length of the portions, which are not pits (record marks) equal to each other in the whole recording block. The recording portion 3 is provided with an NRZI (Non-Return-to-Zero Inverted) circuit 12 for converting further the output of the buffer into NRZIs and obtaining record waveform data, for which the level is inverted at a symbol "1" in the coded data, and a timing generating circuit 15 for controlling timing in the recording portion 3.

Resynchronizing signal generating means is composed of the irregular generating circuit 10, the buffer (BUFF) 11, the pit (run length) measuring circuit 13 and the pit length (run length) judging circuit 14 in the recording portion 3, while information recording means for recording information in the recording medium is composed of an NRZI exchanging circuit 12 in the recording portion 3 and a part of the writing/reading head portion 2.

The reproducing portion 4 is disposed for reproducing and decoding the detection signal detected by the writing/reading head portion 2. Since the detail thereof is disclosed in U.S. Ser. No. 07/460,370 and Ser. No. 07/588,361, they are referred to and only conception thereof will be explained here. In the present embodiment, the detection signal from the writing/reading head portion 2 is converted into a digital signal by the original waveform detecting method by converting it into a two-valued signal by using a certain slice level. It is provided with a clock synchronizing circuit 16, in which the digital signal is then separated into a lead edge detection signal consisting of pulses corresponding to the position of the lead edge of the state changing portions (record marks) and a tail edge detection signal consisting of pulses corresponding to the position of the tail edge thereof and a pit-synchronized reproducing clock is generated for each of the lead edge detection signal and the tail edge detection signal by using the synchronizing signal (SYNC 421) recorded in the first place of the data area at the recording in the data area 401 and at the same time lead edge data and tail edge data, which are synchronized with the reproducing clock, are obtained; a pattern detecting circuit 18, which detects the resynchronizing signal (RECYNC) contained in the output of the clock synchronizing circuit 16 from the output stated above; a 1-7 decoding circuit for combining the lead edge data and the tail edge data from the clock synchronizing circuit 16 to decode reproduced data; and a timing control circuit 19 effecting timing control for the reproducing portion 3. The reproducing portion 4 constitutes information reproducing means for reproducing data from the recording medium.

Figure 3:
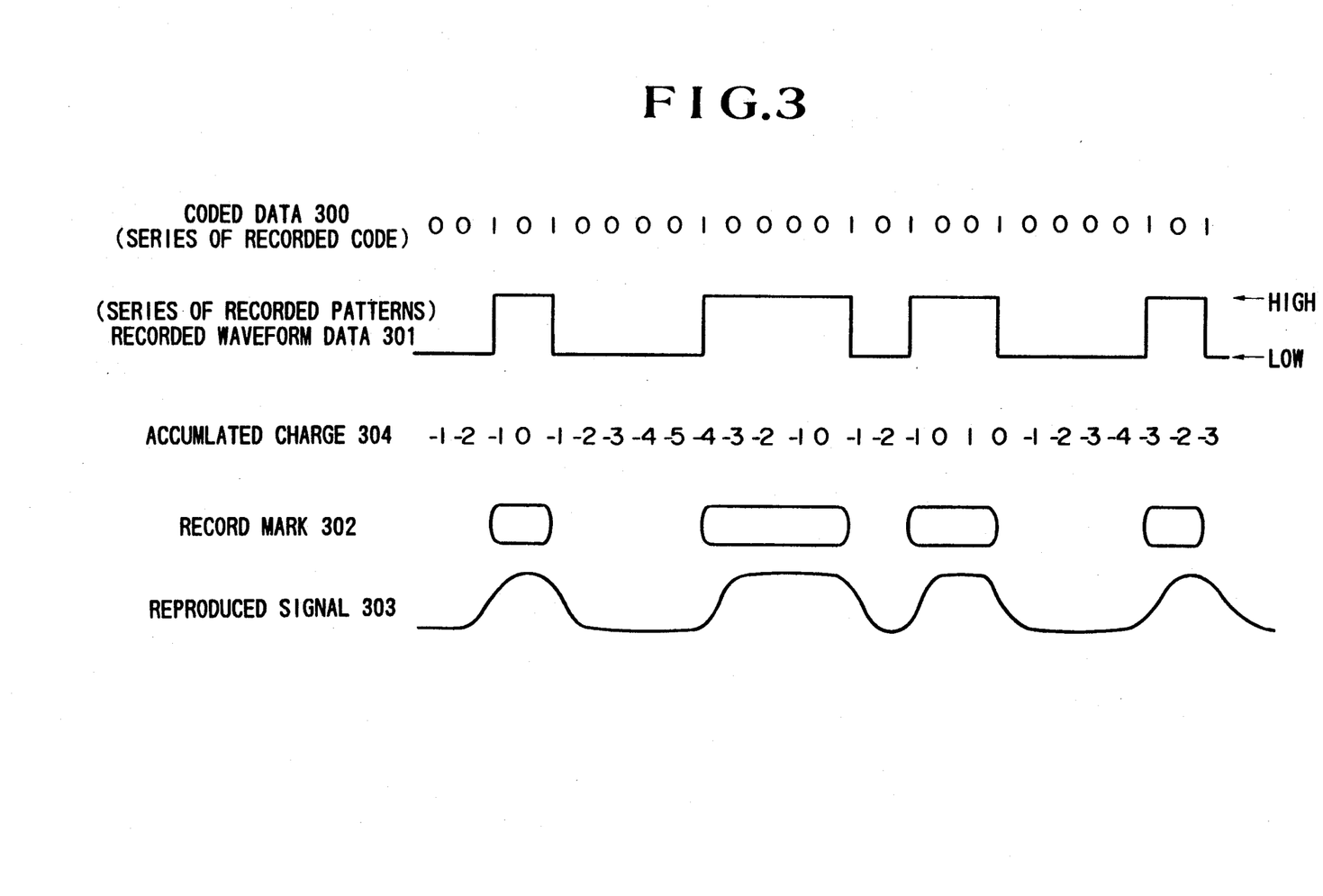
FIG. 3 is a diagram showing waveforms for explaining the operation of the recording method according to the present invention.

Next information recording will be explained, referring to FIG. 3.

Coded data 300 are a series of recorded codes obtained from the write information through the coding circuit 9. An information recording/reproducing system such as an optical disk apparatus, a magnetic disk apparatus, etc. is an RLL (run length limited) system, for which a coding rule used for coding write information is such that the number of "0" between two adjacent symbols "1" in the coded data obtained by the conversion is in a certain extent. This is for the reason why, since the clock information is extracted from the reproduced signal itself when data are decoded at the reproduction, in order to effect stably this extraction operation of the clock information, it is necessary that a polarity inversion serving as the base of the clock information in the reproduced signal exists necessarily within a certain time interval, etc.

The laser light source driving circuit 8 modulates the emission intensity of a laser according to the record waveform data 8 (series of recorded signal patterns) 301. That is, it inverts high/low of the emission intensity, corresponding to "1" in the coded data 300. As the result, record marks 302 are formed one after another in the data area 401 in each of the sectors on the optical disk 1 during periods, where the emission intensity is high, according to the modulation of the laser light.

At the reproduction, a detection signal 303, for which potential level of an electric signal varies, corresponding to presence or absence of the record marks, is obtained. Since noise is superposed abundantly on the low frequency component of this detection signal 303, the noise is removed by means of a filter 70 cutting-off the low frequency component. In the case where there exists a signal component in a frequency region of same degree as the noise stated above in the record waveform data (series of recorded signal patterns) 300, an information component is lost by the filter 70 cutting-off the low frequency component, which causes errors at the data decoding. Consequently, in order to realize recording/reproduction with a high reliability, a contrivance is necessary so that no low frequency component is contained in the record waveform data 301.

As a simple measuring method for detecting the low frequency component in the record waveform data 301, there is known a method using the accumulated charge (DSV) 304. This is a method, by which supposing that the weight corresponding to the "Low" level of the record waveform data is $-1$ and the weight corresponding to the "High" level is $+1$, a value (DSV) obtained by adding accumulatively for every pit is calculated and judgment is effected by using the magnitude thereof. For example, in the case where the absolute value of the DSV values from the beginning to the end of the record waveform data (series of recorded signal patterns) in one sector is great, DC components are contained abundantly in these record waveform data. That is, this means that the duty of the whole is deviated remarkably from 50%.

Consequently, in order to suppress the DC component in the record waveform data, the DSV value is calculated and it may be tried that this is as close as possible to 0 and that the sum of lengths of the record marks recorded in the data area of each of the sectors and the sum of lengths of parts, which are not record marks, are approximately equal to each other. That is, either one of a first code pattern, in which the number of symbols "1" is even, and a second code pattern, in which the number of symbols "1" is odd, is selected so that the value of the accumulated charge (DSV) based on that obtained from the run length in the coded data approaches zero to be used as code patterns for user information signals (DATA) 422 and resynchronizing signals 423 added to the ERR 424 for every predetermined data length.

Next, a concrete example of this resynchronizing signal 423 will be explained. This resynchronizing signal 423 depends on the coding rule used in the coding circuit 9, in order to use code patterns, which are not generated by the coding rule, so that they can be detected also in the case where the clock is deviated by an integer of periods at the reproduction. Consequently here an example of the resynchronizing signal 423 in the case of the (1-7) coding, which is one of RLLs, will be explained as an example.

The 1-7 coding circuit 9 acts according to the 1-7 run length limited code converting rule indicated in TABLE 1. As indicated in TABLE 1, the 1-7 code is generated, depending on the combination of a 1-7 prefixed code, present data, succeeding data.

TABLE 1

| NUMBER OF ITEM | 1-7 PREFIXED CODE | PRESENT DATA | SUCCEEDING DATA | 1-7 CODE | |
|---|---|---|---|---|---|
| 1 | X | 00 | 0X | 001 | X:0 or 1 |
| 2 | 0 | 00 | 1X | 000 | $\overline{00}$:01, 10, 11 |
| 3 | 1 | 00 | 1X | 010 | |
| 4 | 0 | 01 | 0X | 001 | |
| 5 | 0 | 01 | 1X | 000 | |
| 6 | 1 | 01 | 00 | 010 | |
| 7 | 1 | 01 | $\overline{00}$ | 000 | |
| 8 | 0 | 10 | 0X | 101 | |
| 9 | 0 | 10 | 1X | 010 | |
| 10 | 0 | 11 | 00 | 010 | |
| 11 | 0 | 11 | $\overline{00}$ | 100 | |

The 1-7 run length limited code is a code for converting a data word of 2 bits into a code of three bits. In a series of codes generated by conversion according to this coding rule, there are necessarily at least one and at most 7 "0" between two adjacent code symbols "1". A series of codes converted according to the converting rule using the 1-7 run length limited code has the self clocking property, by which the clock information can be extracted from the synchronizing signal itself, because the polarity inversion serving as basis of clock information exists always within a certain time interval in the reproduced signal when decoded at the reproduction.

Figure 4:
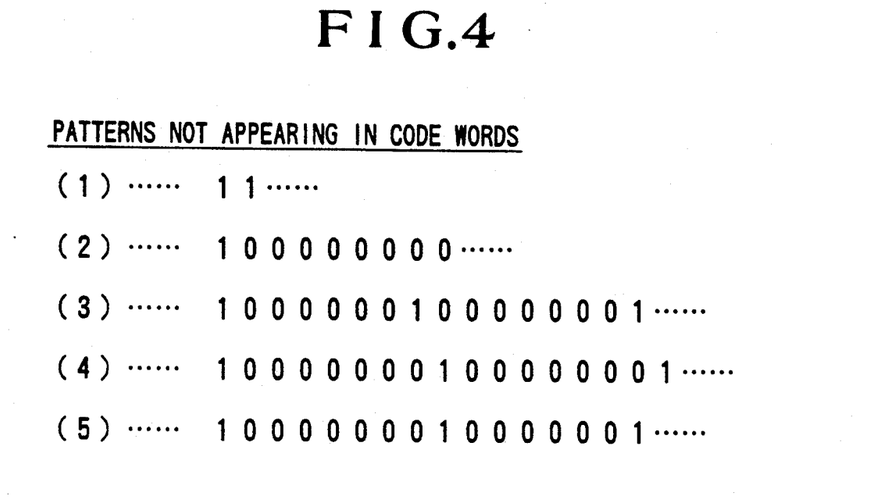
FIG. 4 is a diagram showing examples of code patterns, which are never generated by the 1-7 coding rule (forbidden patterns)

FIG. 4 shows examples of the code patterns (forbidden patterns), which are not generated by this 1-7 coding rule.

(1) and (2) are against the rule that there are always at least one and at most 7 "0" between two adjacent "1". Further in the case of this coding rule, apart therefrom, there exist following forbidden patterns. At first, as indicated by (3), in the case where there are 6 "0" between two adjacent "1", it never happens that there are 7 "0" before the succeeding "1". Further, as indicated by (4) and (5), in the case where there are 7 "0" between two adjacent "1", it never happens that there are more than 5 "0" before the succeeding "1". Still further, from the forbidden rule indicated by (2) to (5) a rule is valid, according to which there are never more than 13 bits between "1" and "1" containing "1" therebetween.

Consequently, in the case where the resynchronizing signal includes either one of the code patterns indicated by (3) to (5), in a binary reproduced signal the interval from a certain rising edge to the succeeding falling edge or the interval from a certain rising edge to the succeeding rising edge is longer than a certain time. Therefore, since the resynchronizing signal can be identified, based only on one edge, the construction of the reproducing portion can be simplified, if the lead and tail edge independent detection method proposed by U.S. Ser. No. 07/460,370 is used.

Although explanation will be made below, taking a resynchronizing signal, for which the forbidden pattern indicated by (5) among the forbidden patterns indicated in FIG. 4 is used as the specified pattern, as an example, the specified pattern contained in the resynchronizing signal used for realizing the present invention is not limited to the forbidden pattern indicated by (5), but the forbidden patterns indicated by (3) and (4) may be used as well therefor.

By making the resynchronizing signal 243 contain the forbidden pattern, in which after 7 "0" have appeared successively between two adjacent "1", 6 "0" appear successively before the succeeding "1", i.e. "1000000010000001" as a specified pattern, it is possible to detect easily the resynchronizing signal 423 recorded together with the write information (user data 422 and error correcting code 424) and inserted therein for every predetermined amount thereof by the pattern detecting circuit 18, distinguished from the write information (user data and error correcting code).

Figure 5:
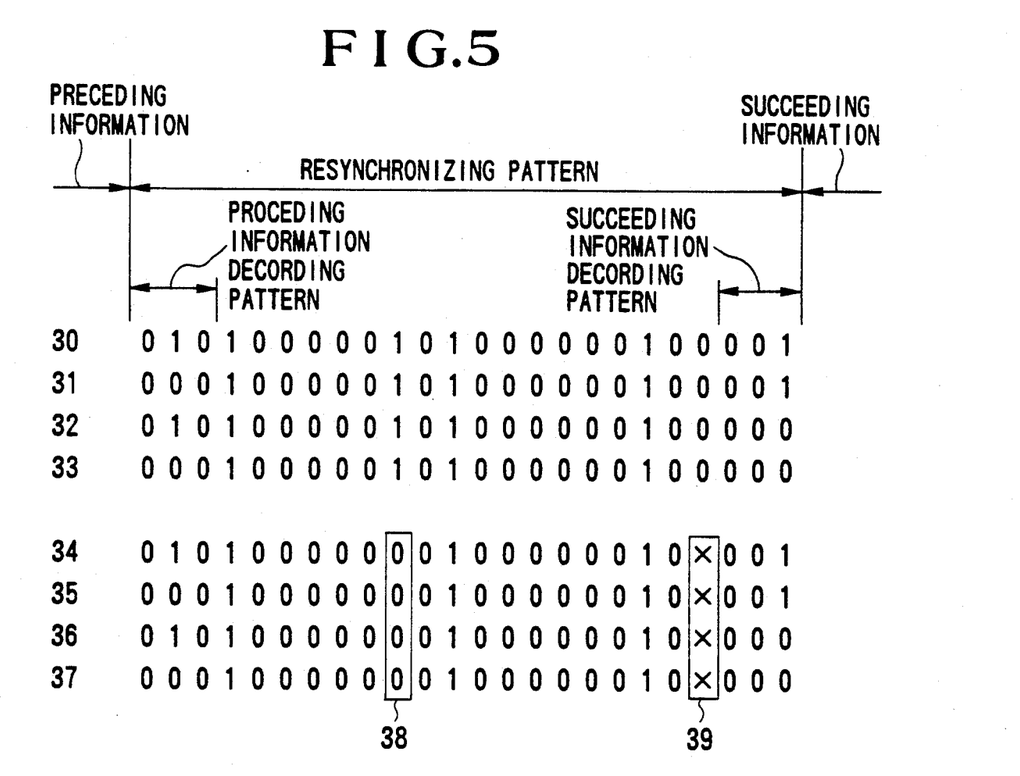
FIG. 5 is a diagram showing an example of the resynchronizing signal pattern used for realizing the present invention.

The specified pattern "1000000010000001" described above doesn't exist in the converting rule in the 1-7 coding circuit 9. In order to generate such a pattern, which doesn't exist in the converting rule, in the embodiment indicated in FIG. 1, synchronizing information consisting of "00", "11", "01", "10", "01", "01", "11" and "01" is inputted as input data to the 1-7 coding circuit for every predetermined interval of the write information at coding the write information and then either one of patterns 30 to 33, as indicated in FIG. 5, is outputted by the 1-7 coding circuit 9 for every predetermined amount (e.g. 30 bytes) of the write information. The differences between the patterns 30 to 33 are produced, depending on whether the codes of the write information inputted to the 1-7 coding circuit 9 directly before and directly after the synchronizing information are "0" or "1". Each of the resynchronizing code patterns 34 to 37 containing the specified pattern "1000000010000001" described above is generated by changing the tenth code 38 in the respective pattern 30 to 33 from "1" into "0" by the irregular generating circuit 10. By the 1-7 run length limited code converting rule, as it can be understood from TABLE 1, in order to decode the write information, decoding is influenced by the codes to be decoded and the codes preceding and succeeding them. In the present embodiment, as indicated by the patterns 34 to 37 in FIG. 5, the resynchronizing pattern is constructed by adding a preceding information coding pattern consisting of either "010" or "000" depending on whether the code of the preceding information is "0" or "1", and a Succeeding information coding pattern consisting of either "001" or "000", depending on whether the code of the succeeding information is "1" or "0", before and after the specified pattern "1000000010000001" which doesn't exist according to the 1-7 converting rule.

Further, as indicated by the patterns 34 to 37 in FIG. 5, the resynchronizing pattern used in the present embodiment includes a pit length (run length) switching code 39 between the specified pattern "1000000010000001" and the succeeding information decoding pattern "001" or "000". This pit length (run length) switching code 39 selects either one of the first resynchronizing pattern, in which the number of codes "1" contained in the resynchronizing signal 423 is even, and the second resynchronizing pattern, in which the number of codes "1" is odd, by switching "0" and "1", depending on the output of the pit length (run length) measuring circuit 13 and the pit length (run length) judging circuit 14, so that the length of the pit portions (record mark portions) and the length of the parts, which are not pit portions (record mark portions) in the record waveform data recorded in the data area 401 of one sector, are equal to each other.

Now the operation of the pit length (run length) measuring circuit 13 and the pit length (run length) judging circuit 14 will be explained. As indicated in FIG. 2, the user DATA 422 and the ECC 424 are divided into data(1), data(2), ..., data(N) and ECC(1), ECC(2), ..., ECC(M), respectively, (N and M representing integers) and resynchronizing signals 423 are added therebetween. Hereinbelow the resynchronizing signal 423 added between data(K) (K representing a certain integer) and data(K+1) is denoted by Resync(K) and the resynchronizing signal 423 added between ECC(K) and ECC(K+1) is denoted by Resync(N+K).

The K-th (K representing a certain integer) resynchronizing signal 423 (Resync(K)) is selected by using the DSV for the period from data(1) to data(K), the level of the waveform data (series of recorded signal patterns) directly before Resync(K) (hereinbelow called signal level), ("Low"/"High"), and the DSV for data(K+1) alone. However the calculation of the value of the DSV for data(K+1) is effected, supposing that the first signal level is "Low".

For example, in the case where the value of the DSV from data(1) to data(K) is a positive number $\alpha$; the last signal level up to that time is "Low"; and the value of the DSV for data(K+1) alone is a positive number $\beta$ (it is supposed that all values of the DSV for the resynchronizing signal alone are 0.), ① when the first resynchronizing pattern, in which the number of inversions (number of symbols "1") by Resync(K) is even, is used, since the first signal level at data(K+1) is "Low", the value of the DSV from data(1) to data(K+1) is $\alpha+\beta$, and ② when the second resynchronizing pattern, in which the number of inversions by Resync(K) is odd, is used, since the first signal level at data(K+1) is "High", the value of the DSV from data(1) to data(K+1) is $\alpha-\beta$. In this case, among them ②, by which the absolute value of the DSV from data(1) to data(K+1) is small, is selected. That is, the pit length (run length) switching code 39 is switched to "0" or "1" so that the second resynchronizing pattern, in which the number of inversions is odd, is generated at Resync(K+1).

Results obtained by effecting these selections in all the cases are indicated in TABLE 2. TABLE 2 indicates a standard for the selection of the resynchronizing signal.

Further, also for the part of ECC 424, it is possible to realize suppression of the low frequency component in the whole record waveform data (series of record signal patterns) by selecting the resynchronizing signal 423 on the basis of a similar criterion.

TABLE 2

| DATA (1) – DATA (K) ACCUMULATED CHARGE | DATA (1) – DATA (K) FINAL LEVEL OF RECORDED SIGNAL | DATA (K + 1) ACCUMULATED CHARGE | RESYNC (K) NUMBER OF POLARITY INVERSIONS |
|---|---|---|---|
| ≧0 | Low | ≧0 | ODD |
|  |  | <0 | EVEN |
|  | High | ≧0 | EVEN |
|  |  | <0 | ODD |
| <0 | Low | ≧0 | EVEN |
|  |  | <0 | ODD |
|  | High | ≧0 | ODD |
|  |  | <0 | EVEN |

Figure 6:
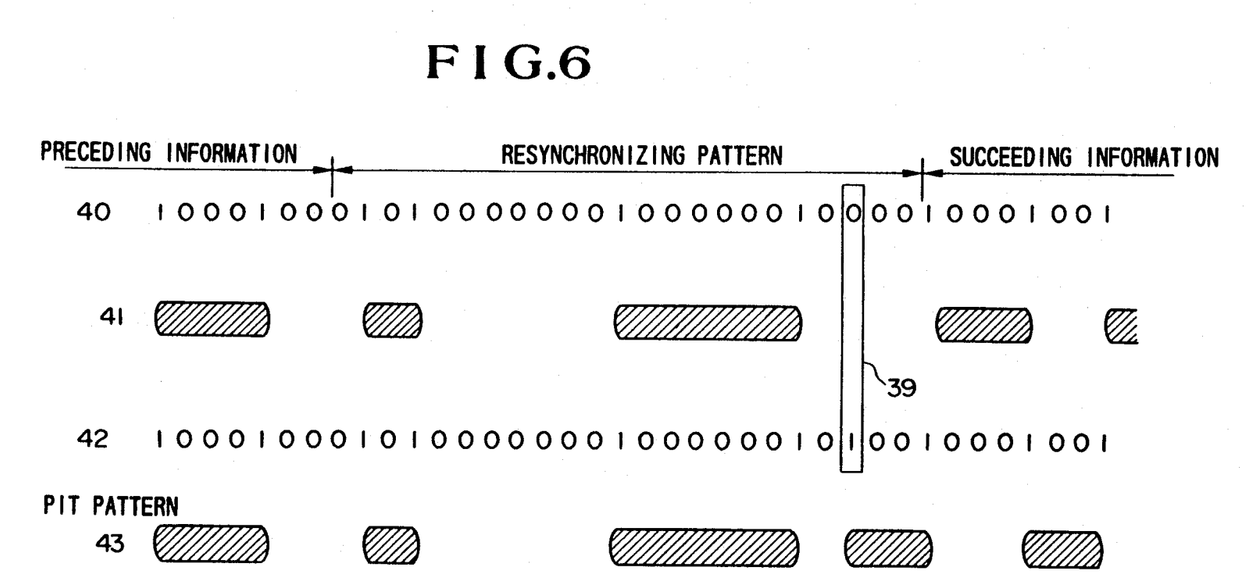
FIG. 6 is a diagram showing the shape of record marks formed on a recording medium for explaining the operation of the pit length switching code.

FIG. 6 shows state change patterns formed on the medium, in the case where the pit length (run length) switching code 39 is switched to "0" or "1", taking the pattern 34 among the resynchronizing patterns 34 to 37 indicated in FIG. 5 as an example. In the case where recording is effected by using a code pattern 40 containing the resynchronizing pattern 34, for which the pit length (run length) switching code 39 is "0", a state change pattern 41 is formed on the medium, as indicated in the figure. On the other hand, in the case where recording is effected by using a code pattern 42 containing the resynchronizing pattern 34, for which the pit length (run length) switching code 39 is "1", a state change pattern 43 is formed on the medium. As described above, regulation is effected so that the sum of the lengths of the pit portions (record mark portions) and the sum of the lengths of the parts, which are not pit portions (record mark portions) in the record waveform data recorded in the data area of each of the sectors, are equal to each other by switching the pit length (run length) switching code 39 contained in the resynchronizing pattern to "0" or "1", depending on the output of the pit length (run length) measuring circuit 13 and the pit length (run length) judging circuit 14.

By using the resynchronizing code pattern according to the present embodiment, since the resynchronizing signal includes the preceding information decoding code pattern for decoding the run length limited code directly before the resynchronizing signal is inserted and the succeeding information decoding code pattern for decoding the run length limited code directly after the resynchronizing signal has been inserted before and after the specified code pattern, respectively, in addition to the specified code pattern "1000000010000001" which doesn't exist in the 1-7 coding rule, when recorded data directly before and directly after the resynchronizing signal are decoded, the 1-7 decoding circuit 17 in the reproducing portion 4 can decode the data, independently from the specified code pattern "1000000010000001" which doesn't exist in the 1-7 coding rule.

The resynchronizing patterns 34 to 37 indicated in FIG. 5 show only examples and patterns other than those used in the present embodiment may be used for the preceding information decoding code pattern and the succeeding information decoding code pattern contained in the resynchronizing pattern. Further the pit length (run length) switching code 39 may be added directly after the preceding information decoding code pattern.

According to the present embodiment, owing to the fact that the resynchronizing signal includes the pit length (run length) switching code 39, it is possible to effect regulation so that the sum of the lengths of the pit portions (record mark portions) and the sum of the lengths of the parts, which are not pit portions (record mark portions) are equal to each other in the whole recording block and thus even if a coding rule having originally no DC free property is used, it is possible to suppress level fluctuations in the reproduced signal, while maintaining the self locking property.

Figure 7:
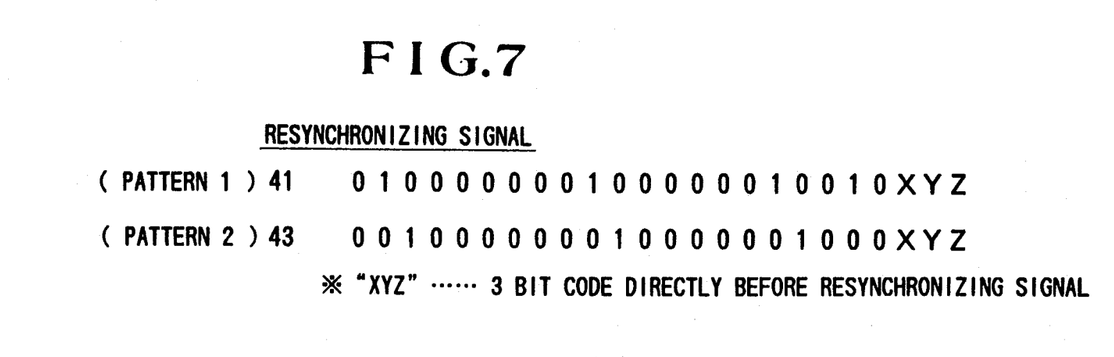
FIG. 7 is a diagram showing another example of the resynchronizing signal pattern used for realizing the present invention.

FIG. 7 shows another example of the resynchronizing signal 423 using the forbidden pattern (5) indicated in FIG. 4. According to the present embodiment a first resynchronizing pattern, in which the number of codes "1" is even, and a second resynchronizing pattern, in which the number of codes "1" is odd, both of them including a specified pattern consisting of at least the forbidden pattern (5), are prepared previously for the resynchronizing signal 423 and either one of the first resynchronizing pattern and the second resynchronizing pattern is selected, depending on the output of the pit length (run length) measuring circuit 13 and the pit length (run length) judging circuit 14. That is, since the resynchronizing pattern according to the present embodiment includes a 3 bit (XYZ) code by write information directly before the resynchronizing signal is inserted, although the number of inversions of the signal level by the resynchronizing pattern varies, depending on the directly preceding code, the number of inversions of the signal level (number of included codes "1") obtained by using the (pattern 1) 41 indicated in FIG. 7 is always greater than that obtained by using the (pattern 2) 43 indicated in FIG. 7 by 1 and thus when either one of them is even, the other is always odd. Consequently, by selecting either one of the first resynchronizing pattern, in which the number of codes "1" is even, and the second resynchronizing pattern, in which the number of codes "1" is odd, between (pattern 1) and (pattern 2) indicated in FIG. 7, depending on the output of the pit length (run length) measuring circuit 13 and the pit length (run length) judging circuit 14, it is possible to generate a resynchronizing signal 423 for suppressing the low frequency component in the record waveform data. (series of recorded signal patterns).

In the present embodiment resynchronizing signal generating means for storing the first resynchronizing pattern and the second resynchronizing pattern may be used in lieu of the irregular generating circuit indicated in FIG. 1. For example, patterns "0100000001000000010010" and "0010000000100000001000" excluding the 3 bits (XYZ) varying, depending on the code directly before the resynchronizing signal is inserted, from (pattern 1) and (pattern 2) indicated in FIG. 7, are stored and either one of the first resynchronizing pattern, in which the number of codes "1" is even, and the second resynchronizing pattern, in which the number of codes "1" is odd, may be generated by adding the 3 bits (XYZ) varying, depending on the code directly before the resynchronizing signal is inserted, to these patterns. The resynchronizing signal can be detected from only one edge and thus the resynchronizing signal in the present embodiment can be used conveniently also for a reproducing system using the lead and tail edge independently detecting system.

Figure 8:
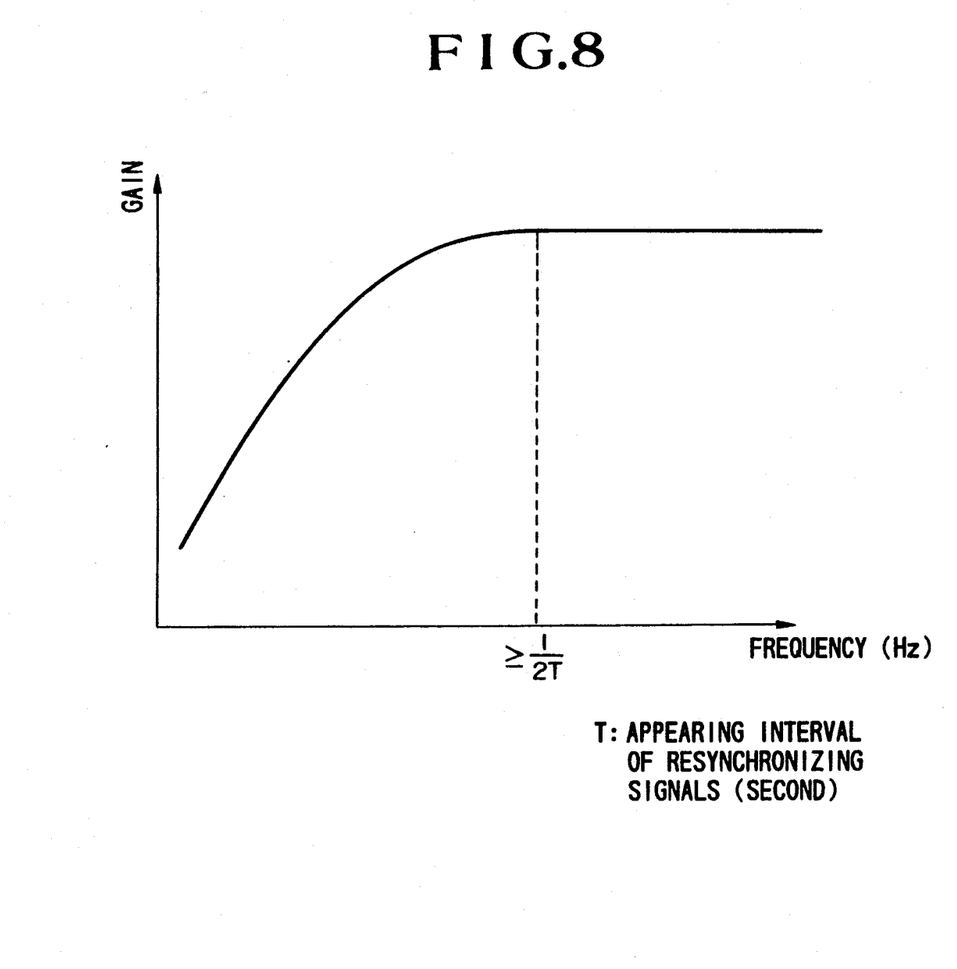
FIG. 8 is a diagram showing transmission characteristics of a filter cutting-off low frequency components.

Finally FIG. 8 shows transmission characteristics of the filter 70 cutting-off the low frequency component used in the case where record marks recorded by using the record waveform data (series of recorded signal patterns), into which this resynchronizing signal 423 is inserted, are reproduced. When the insertion interval of the resynchronizing signal is T second, the reproduced signal obtained in the case where the record marks formed on the recording medium are reproduced contains almost no signal components of the record data below a frequency of ½T Hz. Consequently, since only noise components are contained in the region below this frequency in the reproduced signal, the noise components can be removed with a high efficiency by means of the filter 70 cutting-off the low frequency component. Therefore it is necessary to design the insertion interval T of the resynchronizing signal, taking the recording density and the frequency region of the noise components added to the reproduced signal into account.

As explained above, according to the present invention, it is possible to suppress low frequency components in the recorded signal produced by a coding system having originally no DC free property and to remove the low frequency components, on which noise is abundantly superposed, without loosing any information component on the reproduction side. Therefore it is possible to realize recording/reproduction with a high reliability.

The invention has been described with reference to the preferred and alternate embodiments. Obviously, modifications and alternations will be occur to those of ordinary skill in the art upon reading and understanding the present invention. It is intended that the invention be construed as including all such modifications and alternations in so far they come with the scope of the appended claims or the equivalent thereof.

We claim:

1. A method for recording information on a recording medium comprising the steps of:
   (a) converting write information for every record unit determined, depending on said recording medium, into coded data according to a format previously determined,
   said coded data consisting of a series of run length limited codes, into which said write information is converted according to a predetermined coding rule, a synchronizing signal for synchronizing a reproduced clock added at the beginning of said write information, and a synchronizing signal for resynchronization inserted into said write information inserted for every specified data length,
   said resynchronizing signal being selected between at least one sort of first resynchronizing code patterns, in which the number of symbols "1" included therein is even, and at least one sort of second resynchronizing code patterns, in which said number of symbols "1" is odd;
   each of said first and second resynchronizing code patterns including at least a specified code pattern, which does not meet said coding rule,
   either one selected between said first resynchronizing code pattern and said second resynchronizing code pattern so that an accumulated charge obtained from a run length of said coded data approaches zero being used for said resynchronizing signal;
   (b) obtaining record waveform data, in which a level is inverted at each symbol "1" in said coded data, from said coded data; and
   (c) forming record marks corresponding to said coded data.

2. A method for recording information on a recording medium according to claim 1, wherein the sum of lengths of said record marks and the sum of lengths of parts, which are not said record marks are approximately equal to each other, independently from said write information.

3. A method for recording information on a recording medium according to claim 1, wherein at least said specified code pattern is prepared previously and either one of said first resynchronizing code pattern and said second resynchronizing code pattern is generated, depending on a value of said accumulated charge.

4. A method for recording information on a recording medium according to claim 1, wherein said resynchronizing signal includes, in addition to said specified code pattern, specified bits of a run length limited code directly before said resynchronizing signal is inserted, after said specified code pattern.

5. A method for recording information on a recording medium according to claim 1, wherein said resynchronizing signal includes, in addition to said specified code pattern, a run length switching code comprised of either one of "1" and "0", depending on a value of said accumulated charge.

6. A method for recording information on a recording medium according to claim 1, wherein said resynchronizing signal includes, in addition to said specified code pattern, a first decoding code pattern for decoding a run length limited code directly before said resynchronizing signal is inserted and a second decoding code pattern for decoding a run length limited code directly after said resynchronizing signal has been inserted before and after said specified code pattern, respectively.

7. A method for recording information on a recording medium according to claim 6, wherein said resynchronizing signal includes a run length switching code comprised of either one of "1" and "0", depending on a value of said accumulated charge, between said specified code pattern and said second decoding code pattern.

8. A method for recording information on a recording medium according to claim 6, wherein a 1-7 coding method is used for said predetermined coding rule and said resynchronizing signal includes "1000000010000001" as said specified code pattern.

9. A method for recording information on a recording medium according to claim 8, wherein said resynchronizing signal includes, in addition to a specified code pattern consisting of (1000000010000001), a first decoding code pattern comprised of either one of "010" and "000" for decoding a run length limited code directly before said resynchronizing signal is inserted before said specified code pattern and a second decoding code pattern consisting of either one of "001" and "000" for decoding a run length limited code directly after said resynchronizing signal has been inserted after said specified code pattern.

10. A method for recording information on a recording medium according to claim 1, wherein said resynchronizing signal is made contain said specified code pattern, generating said specified code pattern, which doesn't meet said coding rule, by changing a symbol "1"

at a predetermined position contained in a series of run length limited codes, into which predetermined resynchronizing information is converted according to said coding rule, into "0".

11. A method for storing data on an optical disk comprising the steps of:
    (a) rotating a disk recording medium having track formed by connecting numerous sectors, each comprised of a preformatted area, in which at least addresses are previously recorded, and a data area;
    (b) converting write information for every record unit corresponding to a sector into coded data according to a format previously determined,
    said coded data consisting of a series of run length limited codes, into which said write information is converted according to a predetermined coding rule, a synchronizing signal for synchronizing a reproduced clock added at the beginning of said write information, and a synchronizing signal for resynchronization inserted into said write information inserted for every specified data length,
    said resynchronizing signal being selected between at least one sort of first resynchronizing code patterns, in which the number of symbols "1" included therein is even, and at least one sort of second resynchronizing code patterns, in which said number of symbols "1" is odd;
    each of said first and second resynchronizing code patterns including at least a specified code pattern, which does not meet said coding rule,
    either one selected between said first resynchronizing code pattern and said second resynchronizing code pattern so that an accumulated charge obtained from a run length of said coded data approaches zero being used for said resynchronizing signal;
    (c) obtaining record waveform data, in which a level is inserted at each symbol "1" in said coded data, from said coded data; and
    (d) forming record marks corresponding to record waveform data by irradiating said disk recording medium with a light beam intensity-modulated, depending on said record waveform data, utilizing local temperature rise of said disk recording medium by said light beam,
    wherein an average level of a reproduced signal by said record marks is approximately constant, independently from said write information.

12. A method for storing data on an optical disk according to claim 11, wherein at least said specified code pattern is prepared previously and either one of said first resynchronizing code pattern and said second resynchronizing code pattern is generated, depending on a value of said accumulated charge.

13. A method for storing data on an optical disk according to claim 11, wherein said resynchronizing signal includes, in addition to said specified code pattern, a run length switching code comprised of either one of "1" and "0", depending on a value of said accumulated charge, and either one of said first resynchronizing code pattern and said second resynchronizing code pattern is selected by using said run length switching code.

14. A method for storing data on an optical disk according to claim 11, wherein a 1-7 coding system is used for said predetermined coding rule and said resynchronizing signal includes "1000000010000001" as said specified code pattern.

15. A method for storing data on an optical disk according to claim 11, wherein said resynchronizing signal is made contain said specified code pattern, generating said specified code pattern, which doesn't meet said coding rule, by changing a symbol "1" at a predetermined position contained in a series of run length limited codes, into which predetermined resynchronizing information is converted according to said coding rule, into "0".

16. A method for storing data on an optical disk according to claim 11, wherein, in order to reproduce signals from said disk recording medium,
    (e) said disk recording medium, which is rotated, is irradiated with a light beam to obtain a reproduced signal from light reflected therefrom;
    (f) said reproduced signal is divided into a reproduced signal from a lead edge and a reproduced signal from a tail edge of each of said record marks to generate a bit-synchronizing reproduction clock by using said synchronizing signal for each of a lead edge reproducing signal and a tail edge reproducing signal and at the same time to obtain lead edge data and tail edge data, which are in synchronism with these reproduction clocks, respectively;
    (g) said resynchronizing signal for resynchronization is detected from at least one of said lead edge data and said tail edge data to obtain a RESYNC detection signal corresponding to each of said lead edge data and said tail edge data; and
    (h) relative positional deviations between said lead edge data and said tail edge data are corrected by using said RESYNC detection signal to combine them and reproduced data thus synthesized are restored.

17. An optical disk apparatus comprising:
    (a) means for rotating a disk recording medium having a track formed by connecting numerous sectors, each consisting of a preformatted area, in which at least addresses are previously recorded, and a data area;
    (b) coding means for converting write information for every record unit corresponding to a sector into coded data according to a format previously determined,
    said coded data consisting of a series of run length limited codes, into which said write information is converted according to a predetermined coding rule, a synchronizing signal for synchronizing a reproduced clock added at the beginning of said write information, and a synchronizing signal for resynchronization inserted into said write information for every specified data length,
    said resynchronizing signal being selected between at least one sort of first resynchronizing code patterns, in which the number of symbols "1" included therein is even, and at least one sort of second resynchronizing code patterns, in which said number of symbols "1" is odd;
    each of said first and second resynchronizing code patterns including at least a specified code pattern, which does not meet said coding rule,
    either one selected between said first resynchronizing code pattern and said second resynchronizing code pattern so that an accumulated charge obtained from a run length of said coded data approaches zero being used for said resynchronizing signal;
    (c) recording means for obtaining record waveform data, in which a level is inserted by each symbol "1" in said coded data, from said coded data and forming record marks corresponding to record waveform data by irradiating said disk recording medium with a light beam intensity-modulated, depending on said record waveform data, utilizing local temperature rise of said disk recording medium by said light beam.

18. An optical disk apparatus according to claim 17, wherein said coding means includes at least resynchronizing signal generating means and said resynchronizing signal generating means comprises:

means for generating said specified code pattern;

means for measuring a run length of said coded data; and means for generating either one of said first resynchronizing code pattern and said second resynchronizing code pattern so that an accumulated charge obtained from a run length thus measured approaches zero.

19. An optical disk apparatus according to claim 17, wherein said recording means comprises:

NRZI converting means for obtaining said record waveform data from said coded data;

laser light source driving means for intensity-modulating said light beam, responding to said record waveform data; and an optical head for irradiating said disk recording medium with said light beam.

20. An optical disk apparatus according to claim 17, further comprising:

means for obtaining a reproduced signal from light reflected by said disk recording medium;

means for dividing said reproduced signal into a reproduced signal from a lead edge and a reproduced signal from a tail edge of each of said record marks to generate a bit-synchronizing reproduction clock by using said synchronizing signal for each of a lead edge reproducing signal and a tail edge reproducing signal and at the same time to obtain lead edge data and tail edge data, which are in synchronism with these reproduction clocks, respectively;

means for detecting said resynchronizing signal for resynchronization from at least one of said lead edge data and said tail edge data to obtain a RE-SYNC detection signal corresponding to each of said lead edge data and said tail edge data; and means for correcting relative positional deviations between said lead edge data and said tail edge data by using said RESYNC detection signal to combine them and for restoring reproduced data thus synthesized.

* * * * *